United States Patent [19]

Alberter et al.

[11] Patent Number: 4,725,957
[45] Date of Patent: Feb. 16, 1988

[54] PROCESS FOR CORRECTING ANGLE ERRORS IN AN ELECTRONIC COMPASS IN VEHICLES

[75] Inventors: Günther Alberter; Harald Bauer, both of Nuremberg; Gerhard Hettich, Holzgraben, all of Fed. Rep. of Germany

[73] Assignee: Robert Bosch GmbH, Stuttgart, Fed. Rep. of Germany

[21] Appl. No.: 787,796

[22] PCT Filed: Apr. 17, 1985

[86] PCT No.: PCT/DE85/00124
§ 371 Date: Oct. 16, 1985
§ 102(e) Date: Oct. 16, 1985

[87] PCT Pub. No.: WO86/00129
PCT Pub. Date: Jan. 3, 1986

[30] Foreign Application Priority Data

Jun. 16, 1984 [DE] Fed. Rep. of Germany ....... 3422490

[51] Int. Cl.⁴ ............................................. G01C 17/38
[52] U.S. Cl. .................................... 364/457; 364/571; 364/449; 33/356
[58] Field of Search ............... 364/449, 571, 424, 457; 33/355 R, 356, 357

[56] References Cited

U.S. PATENT DOCUMENTS

| | | | |
|---|---|---|---|
| 4,470,119 | 9/1984 | Hasebe et al. | 364/449 |
| 4,539,760 | 9/1985 | Marchent et al. | 33/356 |
| 4,546,550 | 10/1985 | Marchent et al. | 33/356 |
| 4,586,138 | 4/1986 | Mullenhoff et al. | 364/571 |
| 4,622,754 | 11/1986 | Chujo et al. | 33/356 |

*Primary Examiner*—Gary Chin
*Attorney, Agent, or Firm*—Michael J. Striker

[57] ABSTRACT

A process for correcting inclination dependent angle errors when establishing the driving direction of vehicles with an electronic compass for navigation is suggested. The compass comprises a magnetometer (10) with an evaluation circuit (11) for computing the driving direction. For compensating inclination dependent angle errors on the indicator of the drive direction the inclination angle of the earth field is fed into the evaluation circuit (11) as a calibration dimension (E), subsequently the inclination angle ($\psi$) of the vehicle is established cyclically by means of an inclination measuring device (12) and then the corrected driving direction ($\theta$) is established from the computed driving direction ($\theta'$) as well as from the calibration dimension (E) and the angle of inclination ($\psi$) in accordance with the equation $\theta = f(\theta', \psi, E)$. This corrected driving direction can then be further processed or issued to an indicator (13) (FIG. 1).

6 Claims, 8 Drawing Figures

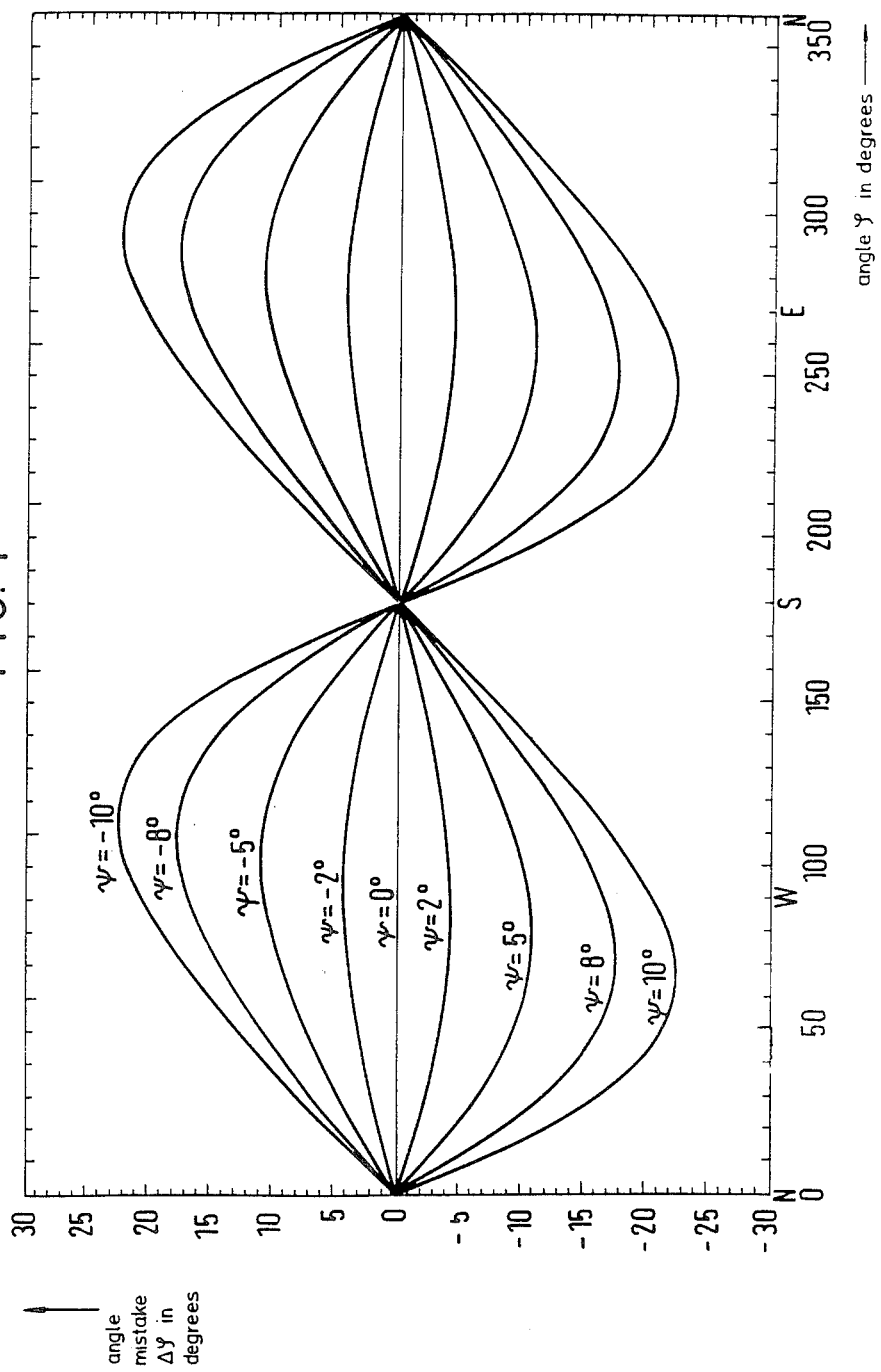

PROCESS FOR CORRECTING ANGLE ERRORS IN AN ELECTRONIC COMPASS IN VEHICLES

BACKGROUND OF THE INVENTION

The invention relates to a process for correcting angle errors when establishing the driving direction of vehicles with an electronic compass. From DE-PS No. 27 54 888 it is known to establish the driving location of a vehicle in a navigation apparatus with a biaxial magnetometer, whose output signals for the compensation of magnetic interference fields in the vehicle are fed to a correction unit wherein a zero point displacement of the output signals as well as a proportional change of one of the output signals is performed. With this solution one assumes that an interference field with a defined vector is present in the vehicle which is superimposed by the earth's magnetic field which is more or less screened by the automobile body depending on the alignment of the vehicle. Since the earth's magnetic field, which is decisive for the driving direction, engages the earth's surface obliquely from above under the so-called inclination angle with respect to the horizontal, only the component is picked up by the magnetometer which is in the plane of driving during the establishment of the drive direction. One axis of the magnetometer is provided in the driving direction and the other transversely to the driving direction. In the stationary installed electronic compass, no measuring error occurs as long as the vehicle drives in a horizontal direction. However, during ascent or descent, an angle error is generated in the electronic compass during the measuring of the driving direction, which may be up to 30° depending on the ascent or descent and dependent on the driving direction. If this angle error is to be avoided, the magnetometer must be provided with a cardanic suspension which is expensive and susceptible to interference, so that the axes of the magnetometer are also in one horizontal plane during ascent and descent driving. However, measuring errors are generated when driving through curves, during acceleration or braking of the vehicle.

It is therefore desireable to compensate the angle errors, which depend from the incline of the vehicle in its longitudinal axis, in a very simple manner.

SUMMARY OF THE INVENTION

The process in accordance with the invention has the advantage that measuring accuracy of the electronic compass is substantially improved by the compensation of the incline dependent angle error. It is considered to be a further advantage that the magnetometer with its associated axis can be mounted stationary in the vehicle. A cardanic suspension is eliminated.

It is particularly advantageous to establish the angle of incline from the earth's acceleration and the slope output power of a body mounted in the vehicle. In order to prevent measuring errors due to acceleration or braking of the vehicle, it is further suggested that the angle of incline ($\psi$) of the vehicle be computed in the evaluation circuit of the electronic compass from the equation $\sin \psi = (a' - c)/g$. Thereby, $a'$ is the total active acceleration on the body in the driving direction, $c$ is the acceleration in the driving direction and $g$ is the earth's acceleration. Advantageously, the acceleration of the vehicle in the driving direction $c$ is established in the evaluation circuit from the signal changes of a drive speed transmitter.

BRIEF DESCRIPTION OF THE DRAWINGS

One exemplified embodiment of the invention is illustrated in the drawings and explained in more detail in the following description.

FIG. 4 illustrates a diagram which reflects the angle error with respect to the driving direction of the vehicle depending on the road slope.

DESCRIPTION OF THE PREFERRED EMBODIMENT

Figure 1:
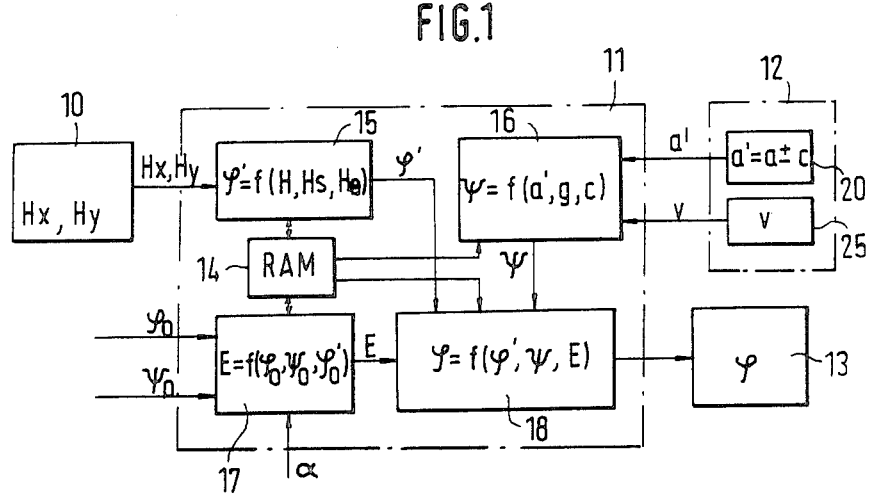
FIG. 1 illustrates a block diagram of an electronic compass for establishing the driving direction of a motor vehicle with incline dependent angle correction in accordance with the invention, FIG. 2 a coordination system with an uphill driving vehicle.

FIG. 1 illustrates the block diagram for an electronic compass which is stationarily mounted for navigation in a motor vehicle. The electronic compass consists of a sensor 10, an evaluation circuit 11, an incline measuring device 12 and an indicator 13. The sensor 10, which, for example, is mounted at the center under the roof of a passenger vehicle (FIG. 3), contains a magnetometer with a time code. The magnetometer is provided with two probes which are disposed in the sensor 10 together with a power supply and a signal former step for each of the magnet field probes. The evaluation circuit 11 is essentially realized by a microcomputer, whose input is fed the sensor signals. For a better illustration of the process in accordance with the invention for correcting incline dependent angle errors when establishing the drive direction of the vehicle, evaluation circuit 11 is broken down into a storage step 14, a computing step 15 for computing the noncorrected direction angle $\theta'$, a further computing step 16 for establishing the vehicle incline in its longitudinal direction, and a correction step 17 for establishing a correction or calibration dimension as well as a further computing step 18 for the angle correction. Through different inputs of the correction step 17, a fixed direction angle $\theta_o$, a fixed angle of incline $\psi_o$, or the inclination angle $\alpha$ of the earth's magnetic field vector (hereinafter referred to as "earth field vector") He can be fed into the evaluation circuit 11 as a calibration value. The computer step 18 is connected with the indicator 13 by means of an output, on which the direction of the vehicle may be indicated in addition to other information.

Figure 2:
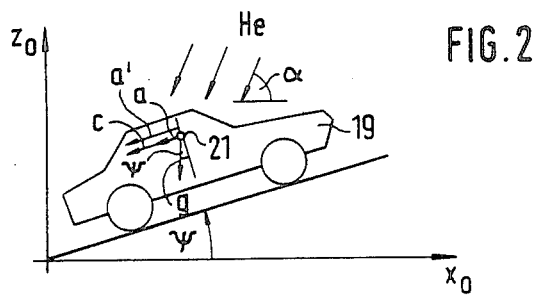

In FIG. 2, a vehicle 19 is illustrated in a coordination system in an oblique incline. The coordination system has a horizontal axis $x_o$ and a vertical axis $z_o$. The oblique plane together with the horizontal axis $x_o$ forms an angle $\psi$. FIG. 2 further illustrates by parallel arrows the direction of the earth field vector He which is active in vehicle 19. This earth field vector He forms an inclination angle with respect to the horizontal plane which in the range of a few hundred kilometers remains practically unchanged. The connecting lines of the places on the earth surface with the same inclination angles are called isoclinics. They are entered in textbooks for navigation in maps (see H. Birr, S. Kuschinsky, L. Uhlig "leitfaden der Navigation—Terrestrische Navigation", Transpress VRB-Verlag fü Verkehrswesen Berlin, (1968)).

Figure 3:
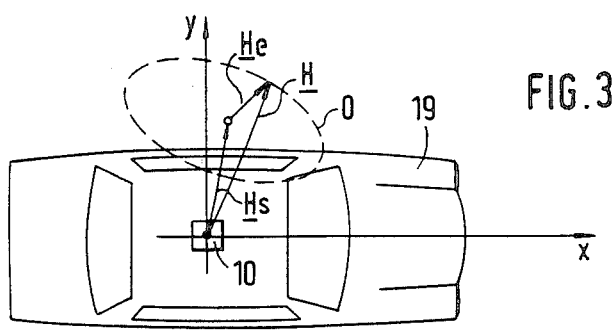
FIG. 3 illustrates a vehicle with the magnet field vector measured by the magnetometer.

FIG. 3 illustrates the vehicle in a plan view. The sensor 10 is aligned with its one sensor axis x with respect to the longitudinal axis of the vehicle and with its other sensor axis y transversely to the longitudinal axis. Thereby, sensor 10 measures the X and Y components of the field vector H which is active thereon and which is composed of a fixed interference field vector Hs and the earth field vector He. As indicated, the earth field vector He which is active on sensor 10 makes an elliptical local curve O during turning the vehicle 19 through a screen in the motor vehicle. Since the vector of the interference field Hs as well as the position and shape of the local curve O are established by calibrated measurements and are stored in storage 14 by constant values, the direction of the earth field He can be established by the electronic compass by means of a vector equation, in that the vector of the magnet field H is cyclically measured by the sensor 10.

Figure 5:
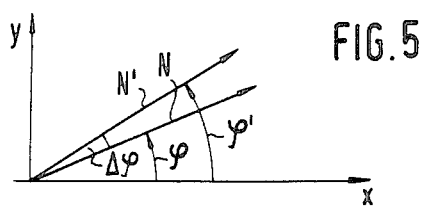
FIG. 5 illustrates the measured and the actual north direction in the coordination system with respect to the longitudinal axis of the vehicle.

In FIG. 4 the occuring angle error $\Delta\theta$ for the direction indicator in dependency from the driving direction with the reference direction north is illustrated in a diagram for different inclination angles $\psi$. As is illustrated in FIG. 5, the angle $\psi$ forms the angle between the longitudinal axis x of the vehicle and the north direction. From FIG. 4 it can be seen that no angle error occurs in a vehicle which drives on a horizontal plane and that maximum angle errors are generated in northwest directions during ascending or sloping stretches. Thereby, in sloping stretches of 10% angle ($\psi \approx 6°$) errors of $\Delta\theta \approx 13°$ may already occur.

Figure 6:
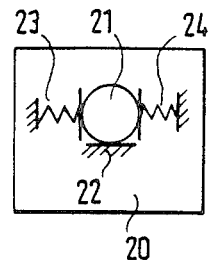
FIG. 6 a schematically illustrated measuring device for the angle of incline of the vehicle and FIGS. 7 and 8 illustrate flow diagrams for the mode of operation of the electronic compass in accordance with FIG. 1.

In order to be able to compensate such an angle error $\Delta\theta$, the incline of the longitudinal vehicle axis must be cyclically established with the inclination measuring device 12. In the simplest way, a position sensor 20 is used for this purpose, as schematically illustrated in FIG. 6. It consists of a body 21 mounted in the vehicle and is mounted on a firm support 22 and is held in its position by two laterally adjacent pressure sensors 23,24. The support 22 is disposed in the driving plane of the vehicle, while the pressure sensor 23 is positioned vertically behind the body 21, seen in the driving direction, and the position sensor 24 in front of the body 21. From the acceleration force parallelogram illustrated in FIG. 2, which engages on body 21, an incline drive acceleration a results which is measured by the pressure sensors 23 or 24 depending on the slope or ascent, while the known earth's acceleration g engages the body 21 in the vertical direction. When the vehicle 19 is accelerated or braked, an additional acceleration or braking $\pm c$ is generated on body 21 which acts in the same or the opposite direction as the slope power output acceleration a. Therefore, the signals transmitted from the the pressure sensors 23 and 24 being fed to the evaluation circuit 11 represent the total active acceleration a' on body 21 in the driving direction which results from the equation $$a' = a \pm c.$$

When the vehicle 19 is idle or when the vehicle drives in a uniform speed the acceleration acting on body 21 is c=0.

The resulting equation for the ascending angle $\psi$ is:

$$\sin \psi = a/g. \quad (a=a')$$

During acceleration or braking of the vehicle 19 the total acceleration a' which had been measured by the position sensor 20 must be corrected by the acceleration c. The establishing of this acceleration is performed in the simplest manner with a driving speed transmitter 25 or with tachometer signals. The driving speed signals are fed to a differentiating member in the evaluation circuit, so as to recover a dimension for the signal change and thereby for the acceleration or braking force c. From the established dimensions the ascending angle $\psi$ can be computed in the computing step 16 in accordance with the equation:

$$\sin \psi = (a' - c)/g$$

Figure 7:
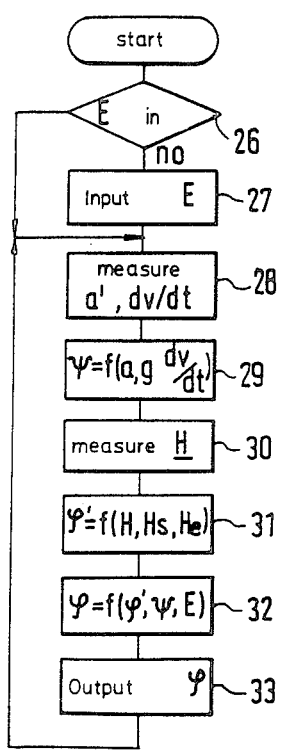

With the assistance of the flow diagram illustrated in FIG. 7, the process for establishing the driving direction of vehicle 19 with the correction of incline dependent angle errors shall now be explained in more detail. In the first program step 26 is is tested whether already a calibration dimension E is stored, after the start of the program of the evaluation circuit 11. If this is not the case, the inclination angle $\alpha$ of the earth's magnetic field is fed in a program step 27 by means of the correction step 27 and the calibration dimension E is formed therefrom and is stored in the storage step 14. Thereby, the inclination angle $\alpha$ or the inclination value for the range in which the vehicle is driven, can be taken in the simplest manner from a map which is provided with isoclinics and be fed into the evaluation circuit 11 by means of feeding keys. In a further program segment 28 the total speed a' and the instantaneous driving speed v is measured with the inclination measuring device 12 and the values are fed as measuring signals to the evaluation circuit 11 and are intermediately stored therein. In the following program segment 29 the inclination angle of the vehicle with respect to its longitudinal axis is established and intermediately stored by means of the computer step 16 of the evaluation circuit 11 from the function equation $$\psi = f(a', dv/dt, g)$$

Thereby, the speed change dv/dt is discreetly divided from the difference of the measured speed v and the previously intermediately stored speed and determined by the time required. In the next program segment 30 the magnetic field H with the components Hx, Hy which had been measured by the sensor 10 is read into the computing step 15 of the evaluation circuit 16. The noncorrected direction angle of vehicle 19 to the north direction is established in segment 31 with the values of the local curve O of the earth field vector He (FIG. 3) and stored in storage 14 in accordance with the function equation $$\theta' = f(H, Hs, He)$$

The corrected direction angle for the vehicle 19 is established with this direction angle 74 ' the measured inclination angle $\psi$ and the calibration dimension E in the program segment 32 in the computing step 18 in accordance with the function equation:

$$\theta = f(\theta', \psi, E).$$

This value is now fed to the indicator 13 in program segment 33. Thereby, the indicator 13 may state the driving direction in the type of a wind rose by means of an arrow or indicate the driving direction in view of a predetermined destination.

After the issue the program now jumps back to the program segment 28, whereby again the data of the inclination measuring device 12 are read into the evaluation circuit 11 for establishing the inclination angle $\psi$. This program segment as well as the subsequent segments 29 to 33 are cyclically run through by the program, so that each change of the driving direction and the vehicle inclination are picked up by the longitudinal axis and the indicator is accordingly corrected.

Figure 8:
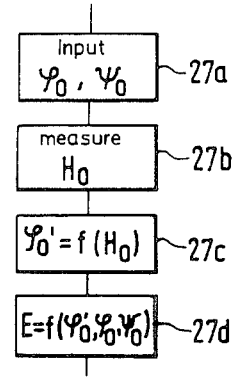

With the evaluation circuit 11 in accordance with FIG. 1 it is also possible to eliminate the feeding of the inclination angle and instead to perform a calibration measuring with the vehicle. For this purpose, the vehicle 19 is placed with its longitudinal axis to a defined cardinal point, for example, in an easterly direction and with a defined ascending angle, for example, 10°. Instead of feeding the inclination angle in the program segment 27 in accordance with FIG. 7, the direction angle $\theta_o = 90°$, which the vehicle assumes in northerly direction and the ascending angle $\psi_o = 10°$ are fed into the correction step 17 of the evaluation circuit 11 in a first step 27a, in accordance with FIG. 8. In a simple manner a calibrating key may be pushed when the vehicle has assumed the predetermined position. In the next step, in the calibrated position of the vehicle 19, the active magnetic field $H_o$ is measured by the sensor 10 and in step 27c the direction angle $\theta_o'$ is established by the computer step 15 from this measurement and stored in the storage step 14. The calibration E is now established in step 27d from the fed data $\theta_o$, $\psi_o$ and the measured direction angle $\theta_o'$ in the correction step 17 in accordance with the function equation $$E = f(\theta_o, \psi, \theta_o')$$

and stored storage step 14. During driving, the drive direction is the cyclically established and indicated with segments 28 to 33 in accordance with the flow diagram illustrated in FIG. 7.

The invention is not only limited to the illustrated exemplified embodiment, since such an electronic compass for determining the driving direction may be used for aircrafts as well as for water vehicles. Moreover, the compass may not be used for determining the driving direction only, but generally for navigation of vehicles which, for example, should be controlled from a fixed predetermined starting point to a defined destination. In such a case, for example, the signals of the driving speed transmitter are used together with the driving direction established by the compass to establish the given location of vehicle 19. In addition for establishing the vehicle inclination or ascending, the given location height of the vehicle may be computed and indicated with a correspondingly constructed evaluation circuit together with the route signals. For an after calibration of height information a predetermined height support point must be fed from time to time.

Instead of the position sensor 20 illustrated in FIG. 5, a pendulum or another device may be used for measuring the inclination of the vehicle. Also, the support 25 for body 21 may be designed as a pressure sensor. This would have the advantage that the braking or acceleration force does not act on this pressure sensor which is disposed parallel to the driving plane, so that a change of the measuring signal on this sensor could be used immediately for establishing the vehicle inclination. However, it is disadvantageous that such a pressure sensor must be spring loaded against shocks due to unevenness on the road and the like.

What is claimed is:

1. A process for correcting an angle error of a driving direction of a vehicle equipped with an electric compass, the vehicle driving on an incline, the process comprising the steps of:

detecting electrical signals emitted from a magnetometer of the electronic compass, the magnetometer being stationarily mounted on the vehicle, the electric signals being responsive to a magnetic field measured by the magnetometer as sensed through at most two horizontally disposed probes, the probes being disposed perpendicular to each other;

feeding and storing a first signal indicative of the inclination angle ($\alpha$) of earth's magnetic field vector (He) into an evaluation circuit of the electronic compass, the first signal thereby representing a stored calibration value (E);

establishing a second signal in the evaluation circuit that is indicative of an inclination angle ($\psi$) in a longitudinal drive direction axis (x) of the vehicle;

establishing a third signal in the evaluation circuit that is indicative of an uncorrected direction angle ($\theta'$) of the vehicle, the uncorrected direction angle ($\theta'$) of the vehicle being dependent on the said detected electrical signals;

establishing a fourth signal in the evaluation circuit that is indicative of a corrected direction angle ($\theta$) of the vehicle, the corrected direction angle ($\theta$) of the vehicle being dependent upon the said established uncorrected direction angle ($\theta'$), the said stored calibration value (E), and the said established inclination angle ($\psi$) in the longitudinal drive direction axis (x) of the vehicle; and compensating for angle error ($\Delta\theta$) of the driving direction of the vehicle based on the said established fourth signal indicative of a corrected direction angle ($\theta$), the angle error ($\Delta\theta$) being dependent on said inclination angle ($\psi$) of the vehicle.

2. The process as defined in claim 1, wherein the establishing of the inclination angle ($\psi$) of the vehicle includes deriving the inclination angle ($\psi$) of the vehicle as a function of earth's gravitational acceleration (g) and acceleration of a body in the vehicle due to acceleration of the vehicle driving on the incline (a).

3. The process as defined in claim 2, wherein the establishing of the inclination angle ($\psi$) of the vehicle in the evaluation circuit includes satisfying the expression $\sin \psi = (a' - c)/g$, in which $\psi$ is the inclination angle of the vehicle, a' is the total active acceleration which is active on the vehicle body in the driving direction, c is the acceleration of the vehicle in the driving direction, and g is the earth's gravitational acceleration (g).

4. The process as defined in claim 3, wherein the establishing of the inclination angle ($\psi$) of the vehicle includes determining the acceleration of the vehicle in the driving direction (c) based on a change in driving speed of the vehicle (dv) per unit time (dt).

5. The process as defined in claim 1, wherein the establishing of the first signal includes reading an isoclinic off a map and feeding the read off isoclinic into the evaluation circuit.

6. The process as defined in claim 1, wherein the vehicle is in a predetermined initial position at a predetermined compass bearing and predetermined inclination with respect to the longitudinal axis of the vehicle; further comprising:

feeding and storing a fifth signal indicative of the initial predetermined compass bearing into the evaluation circuit to represent a first fixed value ($\theta_o$);

feeding and storing a sixth signal indicative of the predetermined inclination to represent a second fixed value ($\psi_o$);

establishing the driving direction ($\theta_o'$) of the vehicle in the initial position based on said electrical signals from the magnetometer, the establishing and storing of the first signal being based on the said established driving direction ($\theta_o'$) of the vehicle in the intial position and the fifth and sixth signals representing first and second fixed values.

* * * * *